(12) United States Patent
Durvasula et al.

(10) Patent No.: US 12,340,374 B2
(45) Date of Patent: Jun. 24, 2025

(54) SYSTEMS AND METHODS FOR BLOCKCHAIN BASED PAYMENT NETWORKS

(71) Applicant: American Express Travel Related Services Company, Inc., New York, NY (US)

(72) Inventors: Sastry Durvasula, Phoenix, AZ (US); Andras Ferenczi, Peoria, AZ (US); Upendra Mardikar, San Jose, CA (US); Keshav Narsipur, Chandler, AZ (US); Vishnuvajhala Subrahmanyam, Phoenix, AZ (US); Sathish B. Muthukrishnan, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 17 days.

(21) Appl. No.: 18/307,586

(22) Filed: Apr. 26, 2023

(65) Prior Publication Data
US 2023/0267469 A1    Aug. 24, 2023

Related U.S. Application Data

(63) Continuation of application No. 17/068,439, filed on Oct. 12, 2020, now Pat. No. 11,669,841, which is a continuation of application No. 15/266,350, filed on Sep. 15, 2016, now Pat. No. 10,832,247.

(51) Int. Cl.
G06Q 20/40     (2012.01)
G06Q 20/10     (2012.01)
G06Q 20/36     (2012.01)
G06Q 20/38     (2012.01)

(52) U.S. Cl.
CPC ......... *G06Q 20/4016* (2013.01); *G06Q 20/10* (2013.01); *G06Q 20/3678* (2013.01); *G06Q 20/3829* (2013.01); *G06Q 20/389* (2013.01)

(58) Field of Classification Search
CPC .............. G06Q 20/4016; G06Q 20/10; G06Q 20/3678; G06Q 20/3829; G06Q 20/389
USPC ......................................................... 705/41
See application file for complete search history.

(56) References Cited

U.S. PATENT DOCUMENTS

| | | | |
|---|---|---|---|
| 9,935,772 | B1 | 4/2018 | Madisetti et al. |
| 2003/0131073 | A1 | 7/2003 | Lucovsky et al. |
| 2013/0117087 | A1 | 5/2013 | Coppinger |
| 2016/0342978 | A1 | 11/2016 | Davis et al. |

(Continued)

*Primary Examiner* — Lindsay M Maguire
(74) *Attorney, Agent, or Firm* — Thomas | Horstemeyer, LLP

(57) ABSTRACT

The present disclosures presents system and methods for blockchain based payment networks. One such method comprises preparing, by a payment network, a request to complete a transaction from an digital currency account associated with a payer digital wallet for entry on a blockchain ledger, wherein the request to complete the transaction includes an amount and a payee address associated with a fiat currency account; sending the request to complete the transaction to the blockchain ledger; approving the request to complete the transaction; and adjusting a balance of the payer digital wallet and a balance of the fiat currency account in response to approval of the request to complete the transaction by writing the transaction comprising the amount and the payee address to the blockchain ledger, wherein a value of the digital currency substantially matches a value of the fiat currency.

20 Claims, 12 Drawing Sheets

(56) References Cited

U.S. PATENT DOCUMENTS

| | | |
|---|---|---|
| 2016/0342989 A1 | 11/2016 | Davis |
| 2016/0345978 A1 | 12/2016 | Cruise et al. |
| 2017/0232300 A1 | 8/2017 | Tran et al. |
| 2017/0372300 A1 | 12/2017 | Dunlevy et al. |
| 2018/0006826 A1 | 1/2018 | Smith et al. |
| 2018/0025442 A1 | 1/2018 | Isaacson et al. |
| 2018/0075453 A1 | 3/2018 | Durvasula et al. |

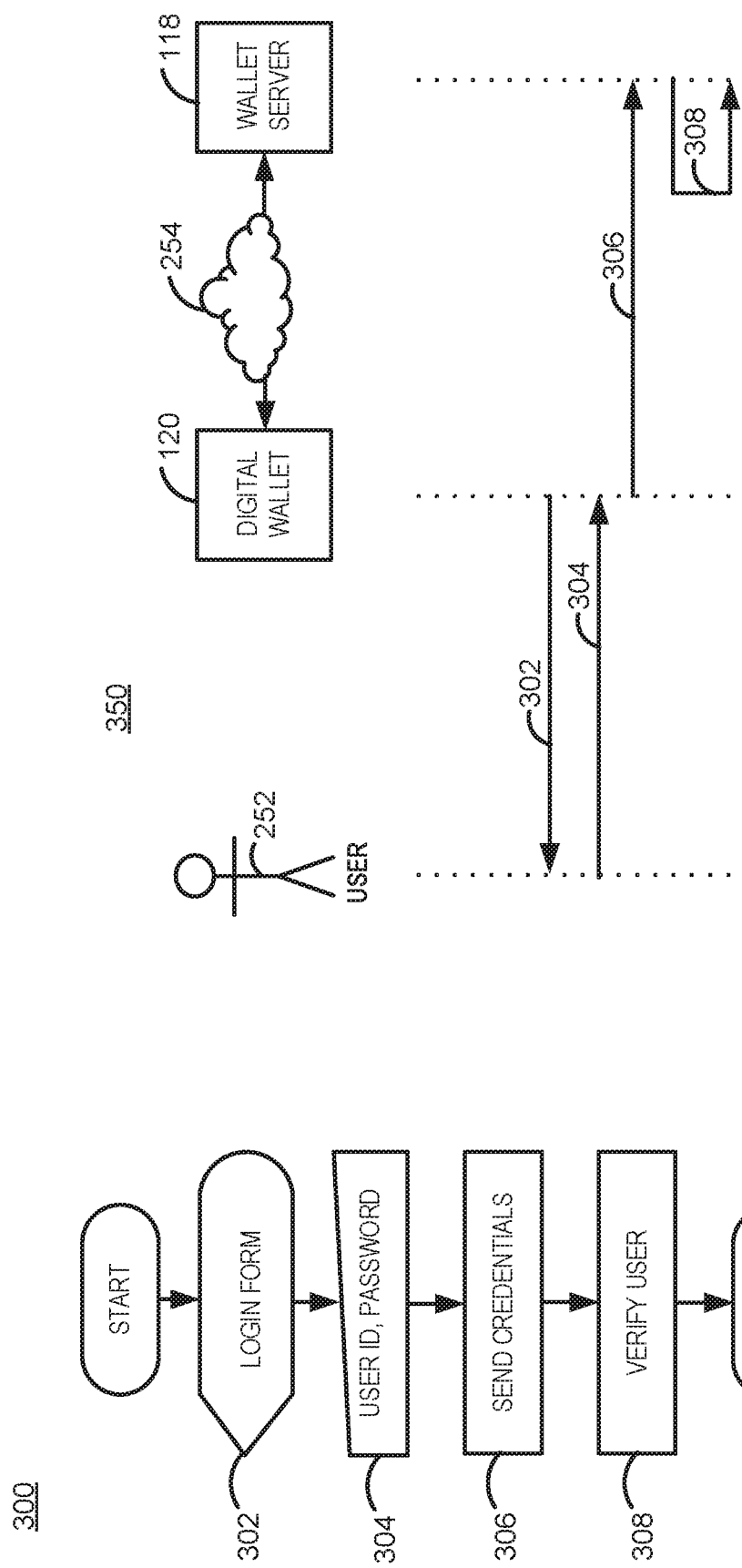

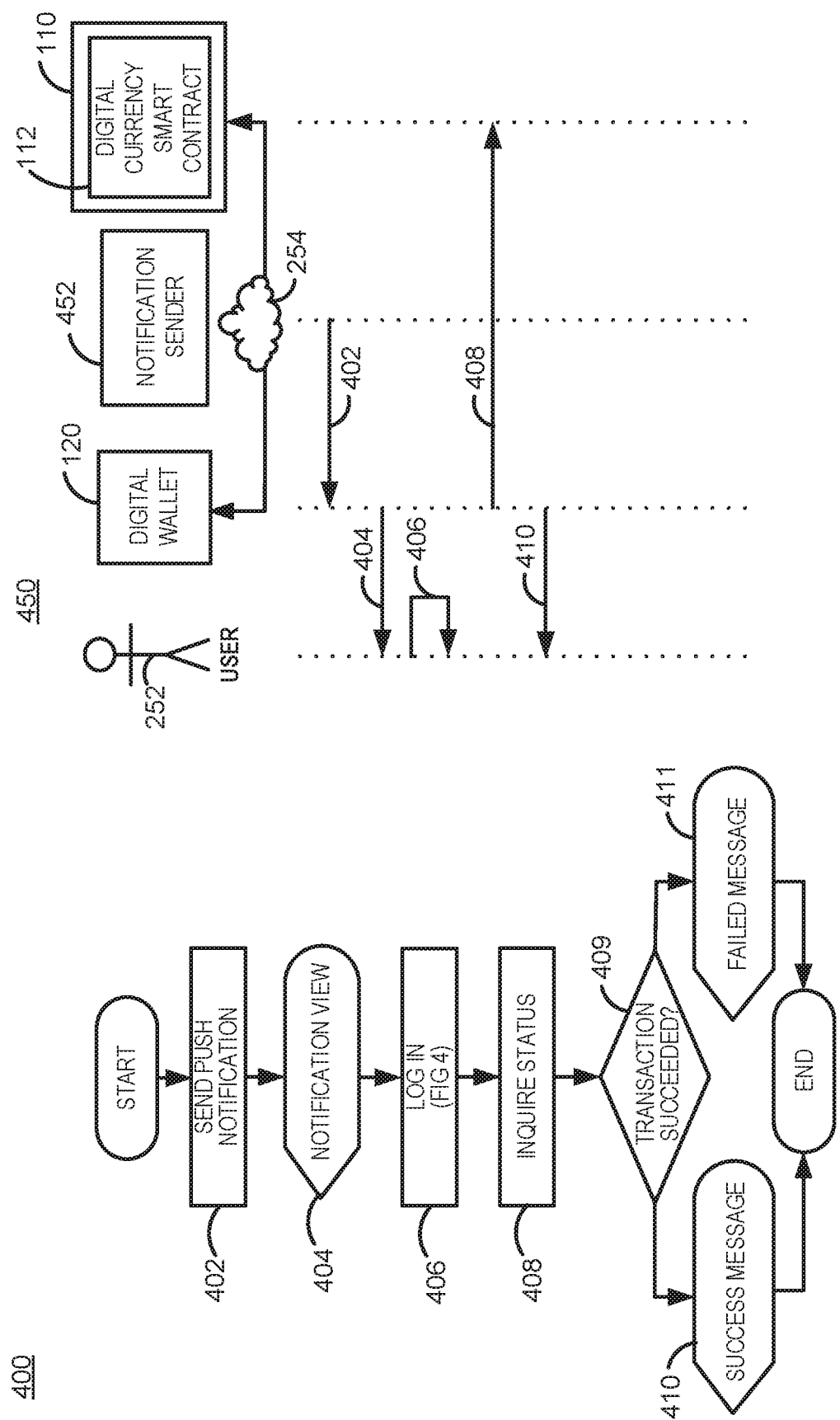

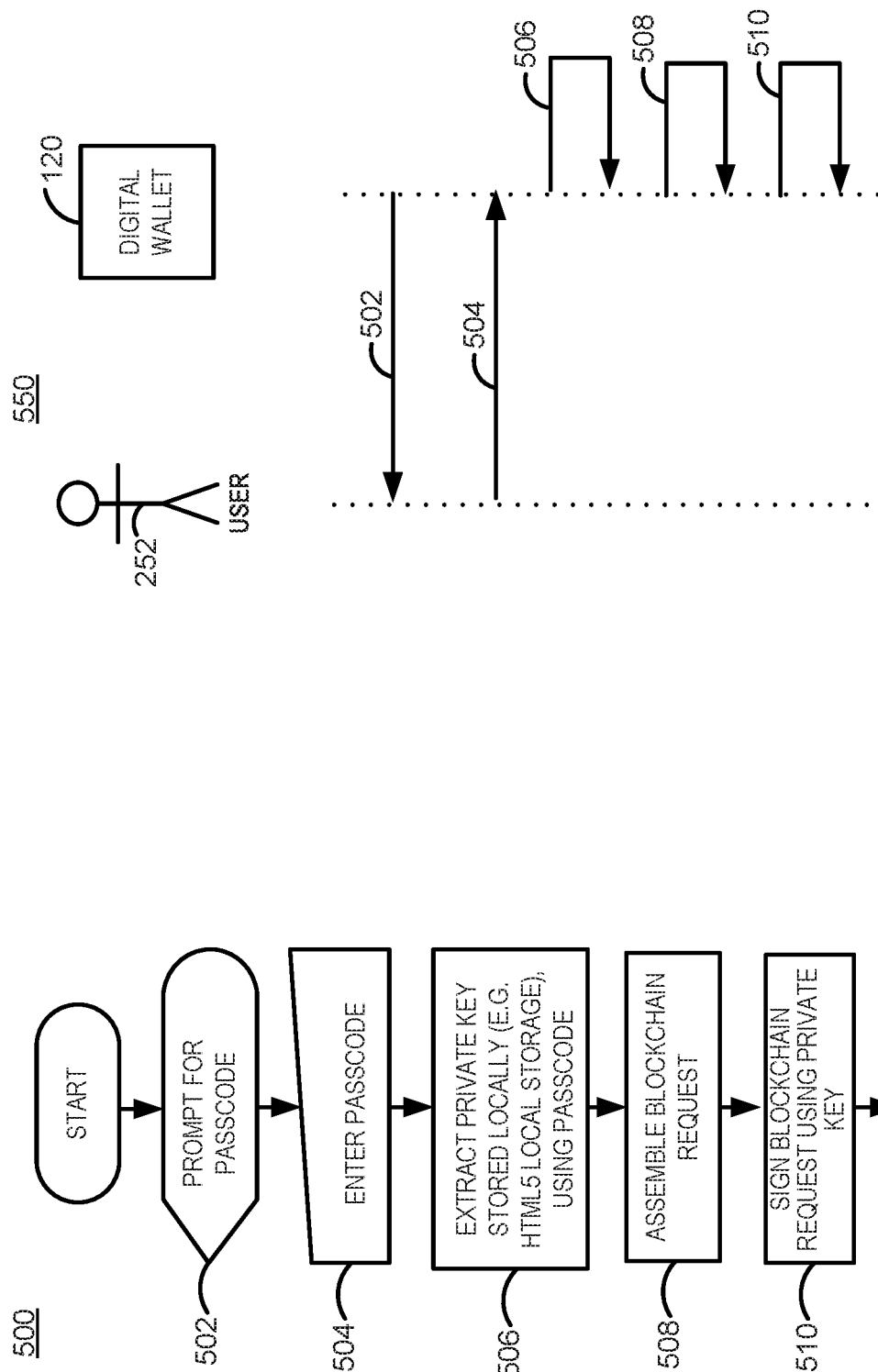

SYSTEMS AND METHODS FOR BLOCKCHAIN BASED PAYMENT NETWORKS

CROSS-REFERENCE TO RELATED APPLICATION

This application is a continuation of, and claims priority to, co-pending U.S. patent application entitled "SYSTEMS AND METHODS FOR BLOCKCHAIN BASED PAYMENT NETWORKS," filed on Oct. 12, 2020, and assigned application Ser. No. 17/068,439, which is a continuation of, and claims priority to, U.S. patent application entitled "SYSTEMS AND METHODS FOR BLOCKCHAIN BASED PAYMENT NETWORKS," filed on Sep. 15, 2016, and assigned application Ser. No. 15/266,350, each of which is incorporated herein by reference in its entirety.

TECHNICAL FIELD

This disclosure relates to systems and methods for providing a peer-to-peer payment network running on a distributed database.

BACKGROUND

Payment networks typically implement various systems for processing transactions between merchants and customers. Merchants are members of the payment network and the merchants are authorized to charge to customer accounts. Customers have a transaction account with the payment network. To complete a transaction, a merchant typically transmits a payment request to the payment network with transaction details and the card member's account information. Payment networks typically face increased costs and limitations associated with the traditional payment model. The payment network implements secure protocols for handling the payment requests, and such secure protocols along with network infrastructure are costly to develop and maintain. The high network costs also result in high discount rates charged to merchants using the payment network.

Transacting parties are also limited to predetermined roles based on the type of account they have with the payment network. For example, merchants usually submit transactions to charge customers, while customers cannot submit transactions to charge other customers or merchants. The predetermined roles also make merchant onboarding to the payment network complex and time consuming. Additionally, authorization and settlement take a long time on traditional payment networks. Merchants often wait 48 hours after a transaction before receiving funds in a typical payment network.

Crypto currencies such as Bitcoin exist in the marketplace. However, cryptocurrencies such as Bitcoin rely on completely public blockchains. Furthermore, the value of crypto currencies, like Bitcoin, fluctuates widely making holding such currencies akin to speculation and less viable in emerging markets.

SUMMARY

A system, method, and computer readable medium (collectively, the "system") is disclosed for a payment network using a blockchain-based ledger that is configured to execute payment transactions in response to blockchain requests. The system may prepare a request to complete a transaction from an account associated with a payer digital wallet for entry on a blockchain. The request may include an amount and payee address associated with a payee digital wallet. The system may also send the request to the blockchain using a blockchain interface. The system may approve or decline the request. The system may further adjust a balance of the payer or a balance of the payee to reflect approval of the request. The adjustment may include writing the transaction to the blockchain.

In various embodiments, the system may assess a risk associated with the transaction. The system may also approve the transaction in response to the risk associated with the transaction being acceptable. The system may also transmit a notification (e.g., a push notification) to the payee digital wallet that the transaction was successful. The system may register a digital wallet in response to validating a bank account associated with the payee digital wallet against the blockchain. The digital wallet may include an address and a private key associated with the digital wallet. The address and the private key may be generated by a user device and stored locally on the user device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may he obtained by referring to the detailed description and claims when considered in connection with the drawing figures, wherein like numerals denote like elements.

FIG. 3A illustrates a process for authenticating a user accessing a digital wallet for a payment network configured to operate on a blockchain-based leger, in accordance with various embodiments:

FIG. 3B illustrates a system for authenticating a user accessing a digital wallet for a payment network configured to operate on a blockchain-based leger, in accordance with various embodiments;

FIG. 4A illustrates a process for user notification using push notifications for a payment network configured to operate on a blockchain-based leger, in accordance with various embodiments;

FIG. 4B illustrates a system for user notification using push notifications for a payment network configured to operate on a blockchain-based leger, in accordance with various embodiments;

FIG. 5A illustrates a process for preparing a blockchain for smart contract calls, in accordance with various embodiments;

FIG. 5B illustrates a system for preparing a blockchain for smart contract calls, in accordance with various embodiments;

DETAILED DESCRIPTION

Figure 1:
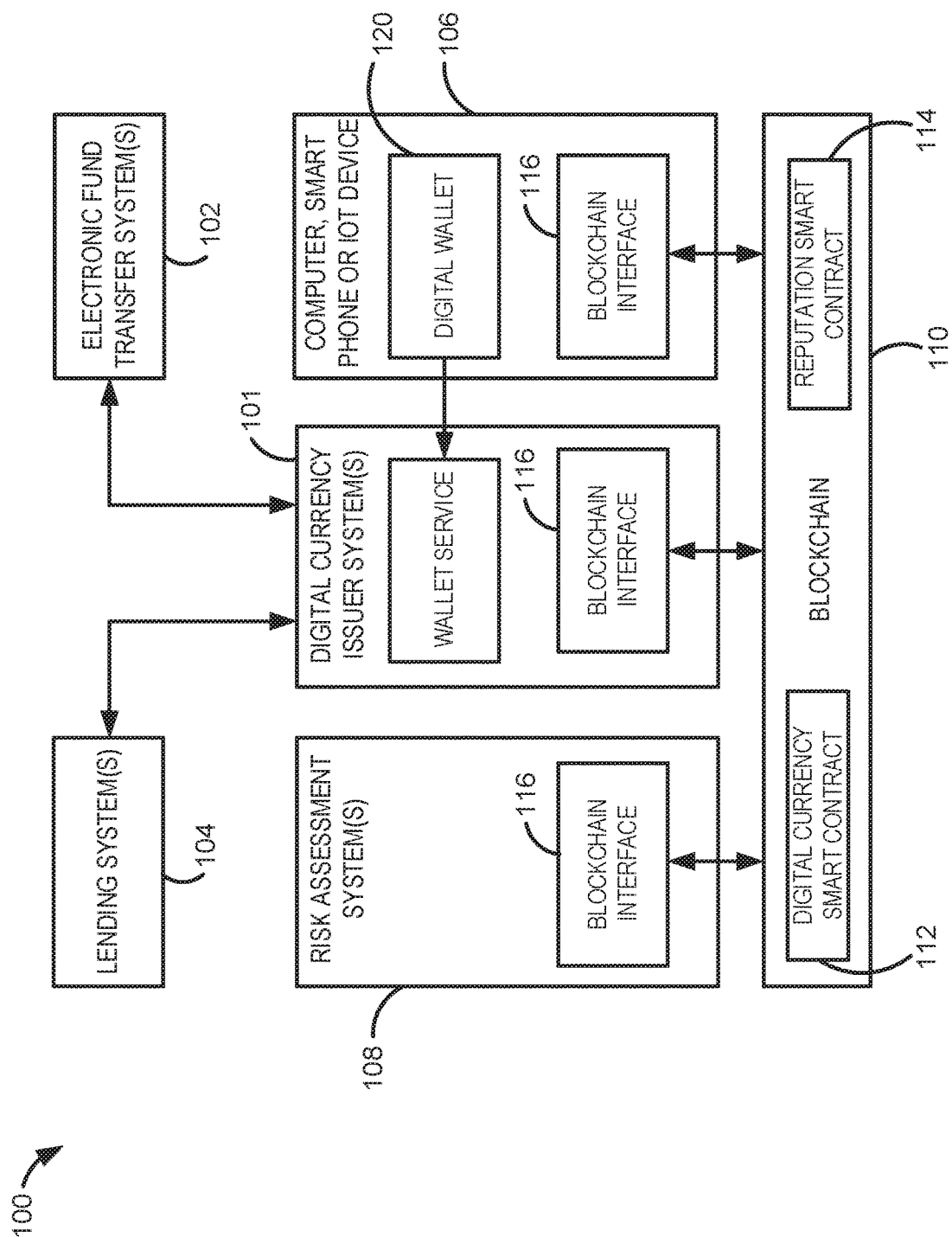
FIG. 1 illustrates a payment system configured to operate on a public, private, or semi-private leger maintained on a blockchain, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A payment network based on peer-to-peer payments may be used to facilitate most functions of traditional card payment networks and to enable additional services and functionality. For example, a blockchain driven peer-to-peer payment network enables near-instant transaction authorization and settlement. Payment, authorization, and settlement on such a network results in money changing hands in an hour, 10 minutes, a minute, or less depending on the infrastructure used to implement the payment network. For a blockchain-based peer-to-peer payment network, a governing organization or consortium may control access to bank transfer services. Anyone can participate in the payment network, but in various embodiments, only users that registered with the managing organization(s) may transfer earned credits into fiat currency via wire transfers to bank accounts. The blockchain may autonomously manage workflows associated with payment processing as described in greater herein.

The payment networks use a distributed ledger, which may be based on a blockchain and thus have consensus based transaction validation. Such payment networks may also enable digital currency smart contracts that enforce business workflows in a decentralized manner and keep track of account balances. The payment networks may also enable reputation based smart contracts that act as a directory of trustworthy entities as part of the network. A digital currency issuer may be included in the payment network and may be configured to transfer balances between external banks and digital currency based wallets vie electronic funds transfer (EFT) systems. The digital currency issuer may also connect customers with lenders to convert lines of credit into digital currencies. The payment network may also include digital wallet services deployed on user devices such as, for example, computers, tablets, smartphones, Internet of Things devices (IoT devices), etc. The digital wallet may enable payments by interacting with the smart contracts and the blockchain underpinning the payment network.

With reference to FIG. 1, a payment system 100 is shown according to various embodiments. The end-to-end workflow of payment system 100 may be orchestrated using smart contracts residing on blockchain 110. A blockchain is a distributed database that maintains records in a readable manner and that is also resistant to tampering. In the context of a payment network, a blockchain may serve as a digital ledger containing transactions conducted on the payment network.

Payment system 100 may include various computing devices configured to communicate via a network. For example, lending systems 104, EFT systems 102, risk assessment systems 108, digital currency issuer systems 101, and user device 106 may each include computing devices configured to perform processes and communicate over a network. The computing devices may include any device capable of receiving and displaying an electronic message via a network and communicating with a blockchain 110.

For example, the computing devices may take the form of a computer or processor, or a set of computers/processors, although other types of computing units or systems may be used. Exemplary computing devices include servers, pooled servers, laptops, notebooks, hand held computers, personal digital assistants, cellular phones, smart phones (e.g., iPhone®, BlackBerry®, Android®, etc.) tablets, wearables (e.g., smart watches and smart glasses). Internet of things (IoT) devices or any other device capable of receiving data over network. Each computing device may run applications to interact with blockchain 110, communicate with other devices, perform crypto operations, and otherwise operate within payment system 100.

As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

The blockchain may comprise a system of interconnected blocks containing data. The blocks can hold transaction data, contract data, and/or other information as desired. Each block may link to the previous block and may include a timestamp. When implemented in support of a payment network, the blockchain may serve as a ledger for transfers of funds, contracts, offers, and other suitable data retained in the blockchain. The blockchain may be a peer-to-peer network that is private, consortium and/or public in nature (e.g., Ethereum, Bitcoin, etc.). Consortium and private networks may offer improved control over the content of the blockchain and public networks may leverage the cumulative computing power of the network to improve security.

A digital currency issuer system 101 may serve as the interface between external systems (e.g., EFT systems 102 or the lending systems 104) and the payment network. Digital currency issuer system 101 may notify the digital currency smart contract 112 of any external events initiated by a user such as, for example, fund transfers or line of credit approvals. Digital currency issuer system 101 may ensure that the digital representation of balances match the fiat balances. As used herein, a fiat balance or a fiat currency refers to a currency established as money by government law or regulation. In that regard, a digital balance may match a fiat balance (i.e., hard currency balance) of an account if the digital currently balance accurately reflects the fiat account balance after applying a conversion rate. For example, if the digital currency can be transferred to and from dollars at a 1:1 rate, then the digital balance matches the fiat balance when the account balances are the same or similar.

In various embodiments, digital currency issuer system 101 may include a blockchain interface 116 configured to interact with the blockchain. Blockchain Interface 116 may be a client library or process used for interacting with blockchain 110. Blockchain interface 116 may be implemented using technologies such as, for example, Ethereum GETH, eth-lightwallet, or other suitable blockchain interface technologies. Digital currency issuer system 101 may also include a wallet service 118 configured to coordinate orchestration between a digital wallet 120 operating on a user device 106 and the external systems (e.g., lending systems 104 and EFT systems 102). For payment interactions, digital wallet 120 running on user device 106 may interact with the blockchain 110 directly using blockchain interface 116 on user device 106.

In various embodiments, EFT systems 102 may include an external (to payment network) server or set of servers that expose a set of application programming interfaces (APIs) for interaction with other computing devices in payment system 100. EFT Systems 102 may manage transfers between bank accounts as orchestrated by the digital currency issuer systems 101.

User device 106 may run a client application that can be a thin client (web) based, hybrid (i.e. web and native, such as iOS and Android), or native application. User device 106 may also be configured to communicate with blockchain 110 by blockchain interface 116. The blockchain interface may be an API or other interface suitable for interacting with blockchain 110.

Payment system 100 may also include a risk assessment system 108 configured to interact with blockchain 110 by blockchain interface 116. Risk assessment system 108 may be in communication with the Blockchain. Risk assessment system 108 may receive and send messages to blockchain 110 over blockchain interface 116. Risk assessment system 108 may retain historical information about user agents, device IDs, transactions, and other data coupled to a user and/or user account. Risk assessment system 108 may assess the likelihood of fraud for a transaction request and provide the assessment to the digital currency smart contract 112 of blockchain 110. Blockchain 110 may be configured to apply changes in response to an acceptable likelihood of fraud and roll the changes back in response to an unacceptable likelihood of fraud.

In various embodiments, blockchain 110 may host the digital currency smart contracts 112 that autonomously govern the workflow of payment system 100 by supporting execution and recording of various actions such as account registration, balance transfers, purchases, or other related actions. Blockchain 110 may be based on blockchain technologies such as, for example, Ethereum, Open Chain, Chain Open Standard, etc. Digital currency smart contract 112 controls the end-to-end flow of the system. Digital currency smart contract 112 is also configured to maintain accounting for various user accounts by keeping a historic record of transactions and balances. Digital currency smart contract 112 may thus include a program written in a programming language such as, for example, Solidity, or any other suitable programming language.

In various embodiments, reputation smart contract 114 may maintain customer feedback on buyers and sellers, based on previously recorded interactions. Reputation smart contract 114 may include a reputation ledger. The reputation ledger may be built over time and recorded on blockchain 110. The relevant portions of the ledger may be provided to potential buyers and sellers prior to their engagement in e-commerce with other users, for example. Merchants and customers may leave feedback within a time limit of a transaction. The transaction may be publicly verifiable as the transaction history is available on the blockchain. The reviews may be numeric and/or text based and may be compiled into one or more reputation scores.

In various embodiments, digital wallet 120 may serve as an interface to a user. In that regard, digital wallet 120 may run on user device 106 as a thin web client, a hybrid app, or a native one. Digital wallet 120 may use a Hierarchical Deterministic (HD) Wallet solution and may use BIP32, BIP39, and/or BIP44 to generate an HD tree of public addresses. Digital wallet 120 may also be configured to interact with the Blockchain either via a Blockchain client, such as GETH, or via API calls using a blockchain as a service provider, such as Microsoft Azure® or Blockapps STRATO, for example. The various computing devices of payment system 100 may be configured to complete payments and execute contracts using blockchain 110 for data storage and/or validation. Smart contracts may be completed by digital signature using asymmetric crypto operations and a private key, for example.

Figure 2A:
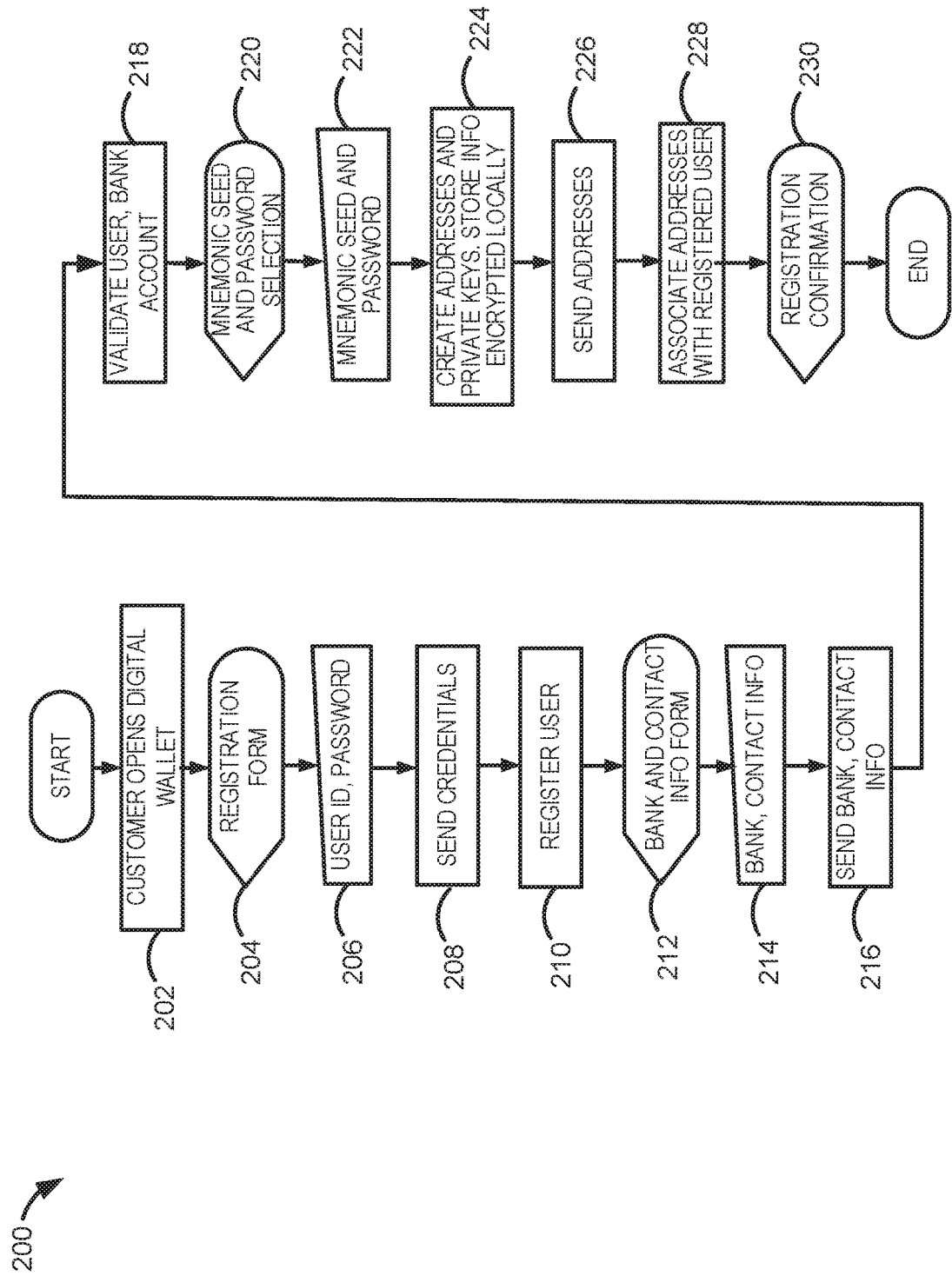
FIG. 2A illustrates a process for registering users for a payment network configured to operate on a blockchain-based leger, in accordance with various embodiments.
Figure 2B:
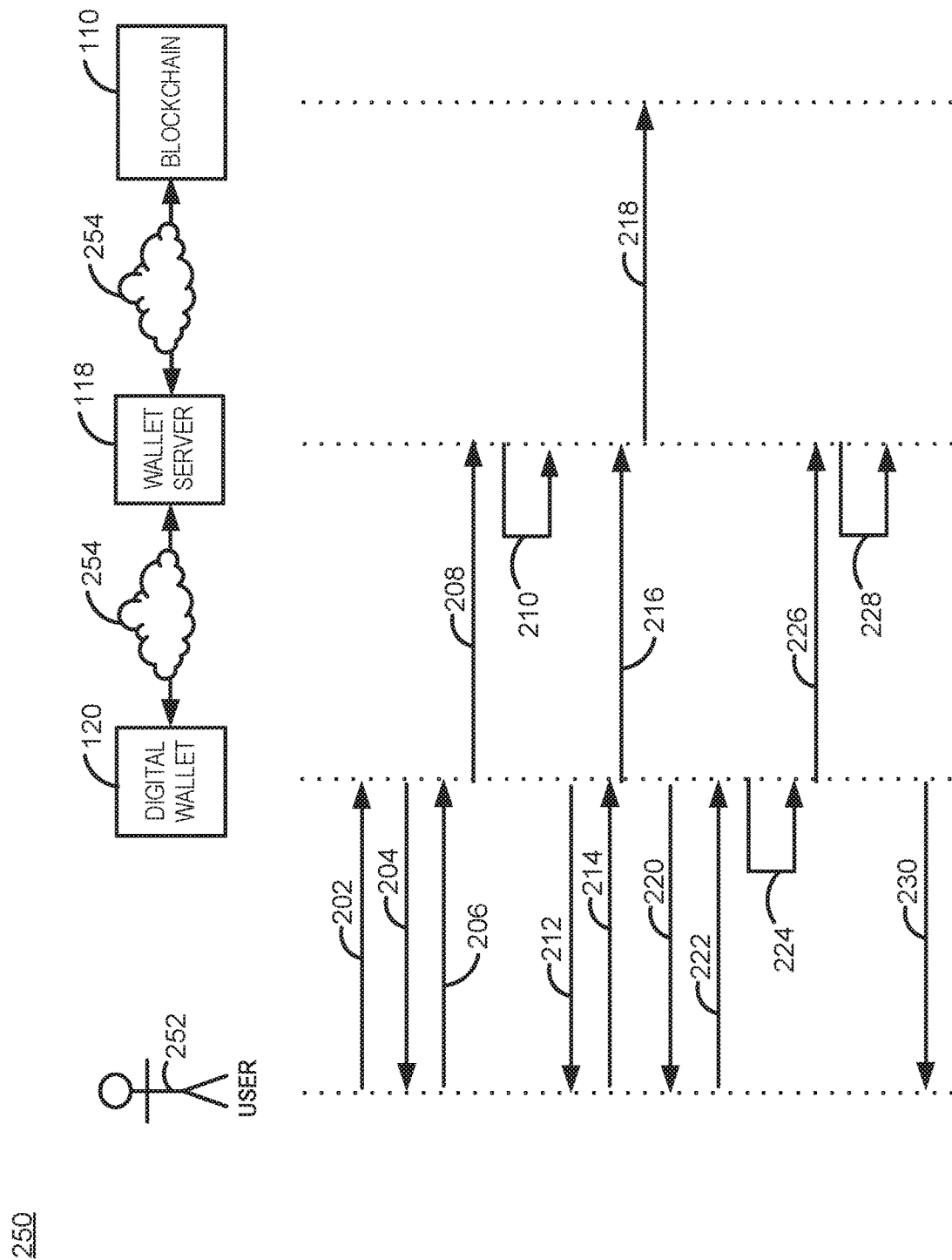
FIG. 2B illustrates a system for registering users for a payment network configured to operate on a blockchain-based leger, in accordance with various embodiments.

Referring to FIGS. 2A and 2B, an exemplary registration process 200 for execution on system 250 is shown, in accordance with various embodiments. User 252 may interact with digital wallet 120 running on a user device 106 to enter and read information. Digital wallet 120 may be in electronic communication with wallet service 118 over network 254. Wallet service 118 may also be in electronic communication with blockchain 110 over network 254. Network 254 may include, for example, a WAN such as the internet, a smaller LAN, or one of the suitable network types described above. The steps of process 200 are oriented on system 250 of FIG. 2B in a possible order of operation with the top arrows indicating earlier execution than the bottom arrows.

Process 200 may begin with user 252 opening a digital wallet 120 (Block 202). Digital wallet 120 running on user device 106 may prompt the user to register by presenting a registration form (Block 204). A registration form may, for example, include fields for user 252 to enter a user name and enter a password. User 252 may thus enter user credentials comprising a user ID, password, and any other information entered into the registration form into digital wallet 120 (Block 206).

Digital wallet 120 may transmit the previously entered credentials to wallet service 118 (Block 208). Wallet service 118 may register the user by storing the credentials in a user database (Block 210). The user database may not be stored on the blockchain that is used as a ledger and instead may be stored in, for example, a relational database. Digital wallet 120 may prompt user 252 for bank and contact information by presenting a bank and contact information form (Block 212). User 252 may fill in fields and thus enter bank and contact information into digital wallet 120 (Block 214).

Digital wallet 120 may transmit the bank and contact information to wallet service 118 over network 254 (Block 216). Wallet service 118 may validate the user and/or bank account and store the relevant information on blockchain 110 (Block 218). In various embodiments, digital wallet 120 may display a mnemonic seed and password selection screen to user 252 (Block 220). Digital wallet 120 may use BIP32, BIP39, BIP44, or another key generation technique to create addresses and private keys, which may be encrypted and stored locally on user device 106 (Block 224). Digital wallet 120 running on user device 106 may transmit the addresses to wallet service 118 for association with the registered user ID (Block 226). Wallet service 118 may transmit registration confirmation to digital wallet 120 in response to a successful registration (Block 230).

With reference to FIGS. 3A and 3B, an exemplary login process 300 for execution on system 350 is shown, in accordance with various embodiments. Login process 300 may include digital wallet 120 presenting a login form to user 252 (Block 302). User 252 may enter login credentials comprising, for example, a user ID and password into the login form. Although user ID and password are used in this exemplary embodiment, other identification and authentication techniques such as fingerprints, facial recognition, gesture recognition, voice recognition, other biometrics, device ID, or other suitable data connected to user 252 may be used. Digital wallet 120 may transmit the credentials to wallet service 118 over network 254 (Block 306). Wallet service 118 may receive the credentials and authenticate the user against stored user login information (Block 308). Authenticated users may then use smart contracts and payment services offered by payment system 100.

With reference to FIGS. 4A and 4B, an exemplary process 400 for execution on push notification system 450 is shown, in accordance with various embodiments. Push notification system may include digital wallet 120 communicating across network 254 with notification sender 452 and/or digital currency smart contract 112.

Process 400 may include notification sender 452 transmitting a push notification to digital wallet 120 running on user device 106. The push notification sender may integrate into a push notification system operated to send push notifications to smart phones and devices running compatible operating systems such as, for example, Android®, iPhone®, and Windows® smartphones (Block 402). Push notifications triggered events written to blockchain 110 such as, for example, successful transactions. Digital wallet 120 may display a notification view on user device 106 for view by user 252 (Block 404). A user may be guided through a login process similar to that illustrated in FIGS. 3A and 3B if the user is not presently logged into digital wallet 120 (Block 406). In response to a successful login, digital wallet 120 may interact with digital currency smart contracts 112 residing on blockchain 110 using blockchain interface 116 (Block 408). Digital wallet 120 may consult blockchain 110 to determine whether a transaction succeeded (Block 409). Successful transactions may be written to a block in blockchain 110 to indicate the success to digital wallet 120. Digital wallet 120 may display a success message 410 or a failed message 411 corresponding to the status of the transaction.

Referring now to FIGS. 5A and 5B, an exemplary process 500 for execution on request preparation system 550 is shown, in accordance with various embodiments. Request preparation system 550 may prepare digital wallet 120 running on user device 106 to interact with blockchain 110. Process 500 may include digital wallet 120 prompting user 252 for a passcode or other suitable input to retrieve locally stored data (Block 502). User 252 may enter the passcode into digital wallet 120 running on user device 106 (Block 504).

In various embodiments, digital wallet 120 may extract asymmetric private keys stored locally on user device 106 using the passcode (Block 506). Digital wallet 120 may prepare a blockchain request to interact with blockchain 110 (Block 508). Digital wallet 120 running on user device 106 may also sign the request to interact with blockchain 110 using the private key retrieved from local storage and applying an asymmetric encryption operation to the request (Block 510).

Figure 6A:
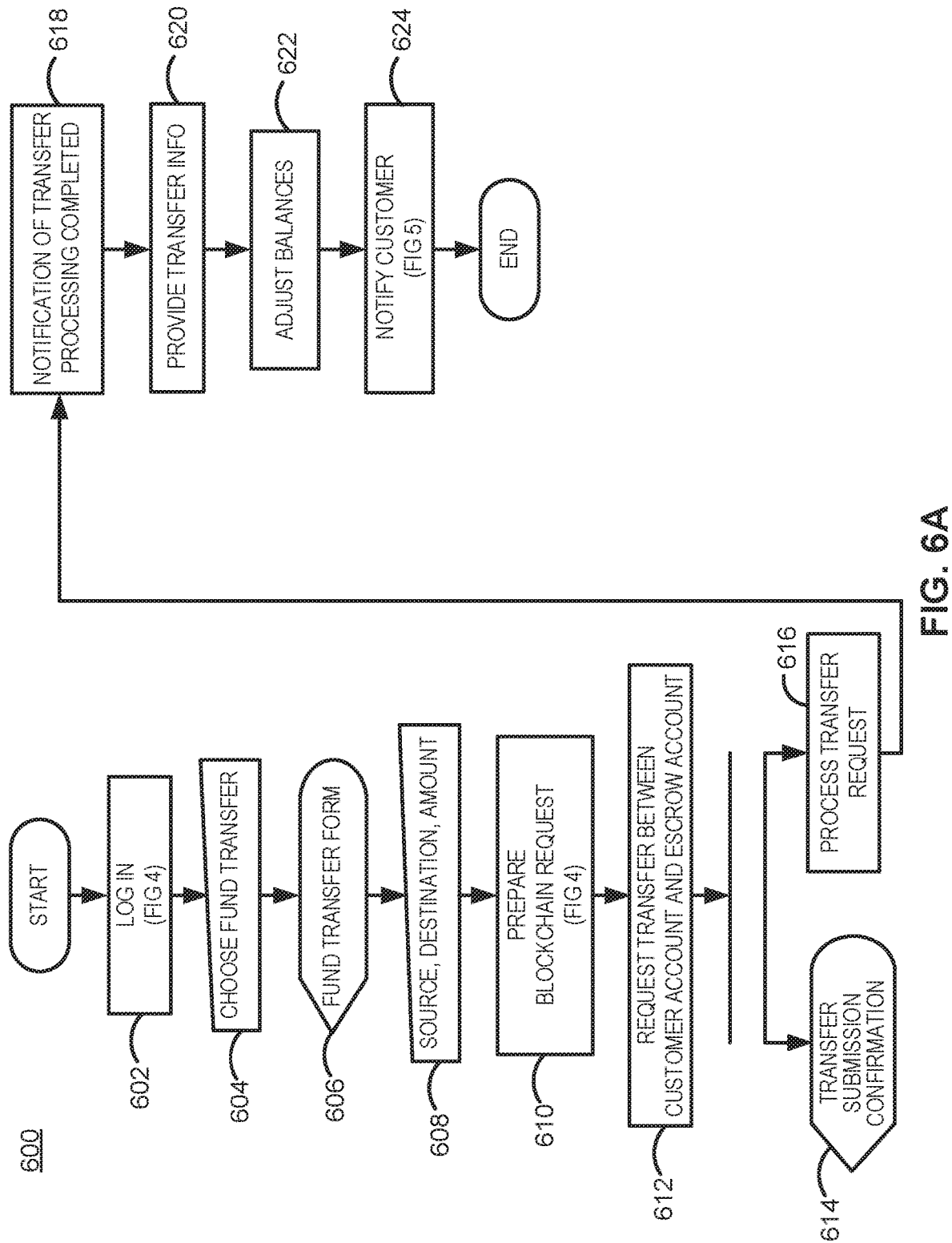
FIG. 6A illustrates a process for transferring funds between fiat currency and digital currency on a payment network configured to operate on a blockchain-based leger, in accordance with various embodiments.
Figure 6B:
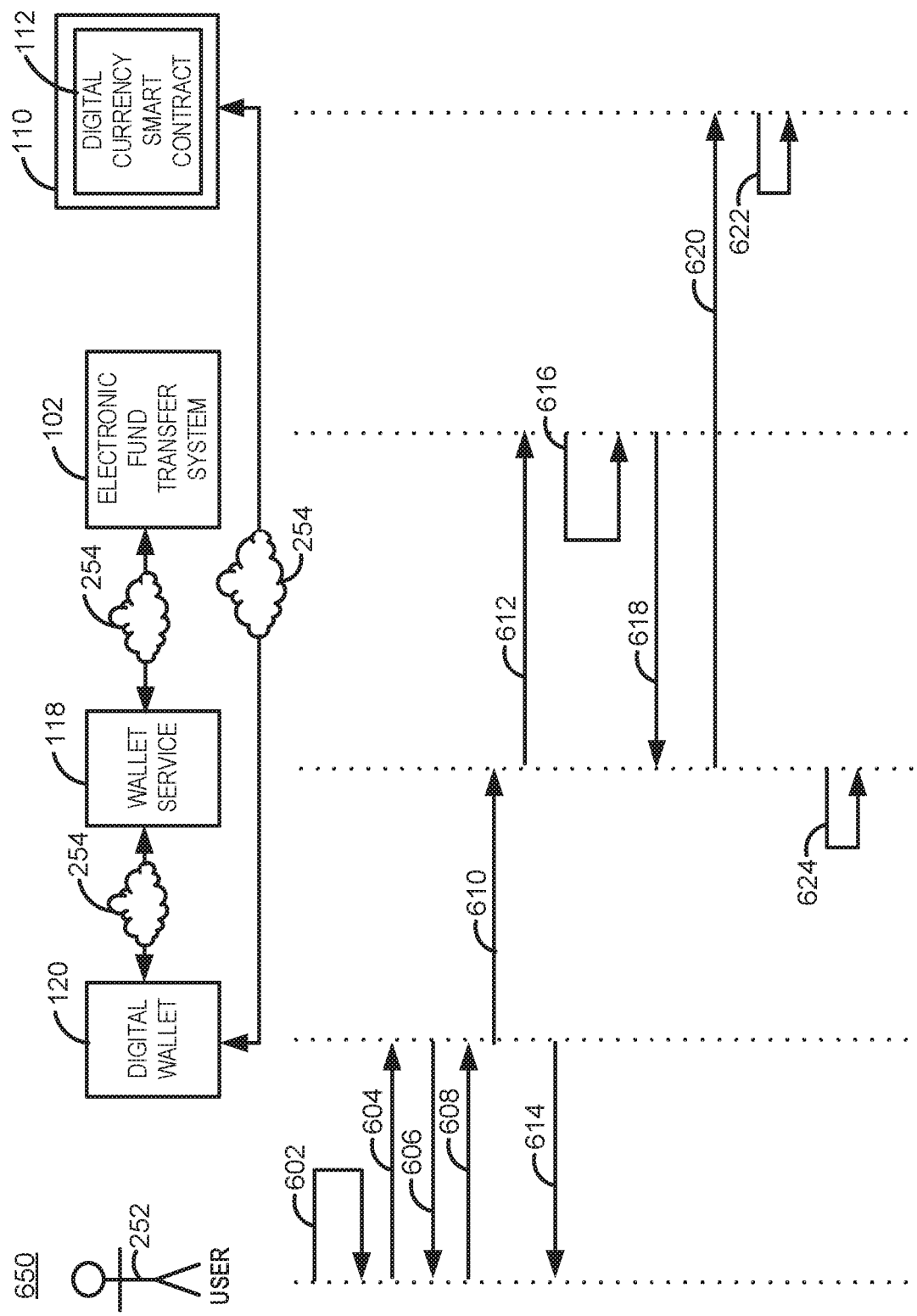
FIG. 6B illustrates a system for transferring funds between fiat currency and digital currency on a payment network configured to operate on a blockchain-based leger, in accordance with various embodiments.

With reference to FIGS. 6A and 6B, an exemplary process 600 for transferring funds between a fiat currency and a digital currency on transfer system 650 is shown, in accordance with various embodiments. Transfer system 650 includes digital wallet 120 in electronic communication over network 254 with wallet service 118 and digital currency smart contract 112 residing on blockchain 110. Wallet service 118 may also be in electronic communication with EFT system 102 over network 254.

Process 600 may include a login process such as, for example, the process described in FIGS. 3A and 3B (Block 602). User 252 may select a fund transfer in the digital wallet 120 (Block 604). Digital wallet 120 may display a fund transfer form in response to the user selection (Block 606). User 252 may populate the fields of the fund transfer form with transfer details such as a source account, destination account, and amount (Block 608). The source account and/or the destination account may be a fiat currency account (e.g., bank account in U.S. dollars) or a digital currency account (e.g., a credit transferable via blockchain). The amount may be a desired amount in the destination currency or a source amount in the source currency.

In various embodiments, digital wallet 120 may prepare a blockchain request as described in FIGS. 5A and 5B for communication to wallet service 118 over network 254 (Block 610). Wallet service 118 may request transfer between user 252 account and an escrow account (Block 612). Digital wallet 120 may display a transfer submission confirmation to user 252 on user device 106 to confirm the transfer (Block 614). EFT system 102 may process the transfer in response to the transfer request and/or the confirmation (Block 616). EFT system 102 may notify wallet service 118 that the transfer was successfully completed (Block 618). Wallet service 118 may then provide the transfer details to digital currency smart contract 112 maintained on blockchain 110 (Block 620). Balances of the user account and escrow account may be updated and stored on blockchain 110 (Block 622). Wallet service 118 may notify user 252 of a successful transfer as illustrated with reference to FIGS. 4A and 4B above (Block 624).

Figure 7A:
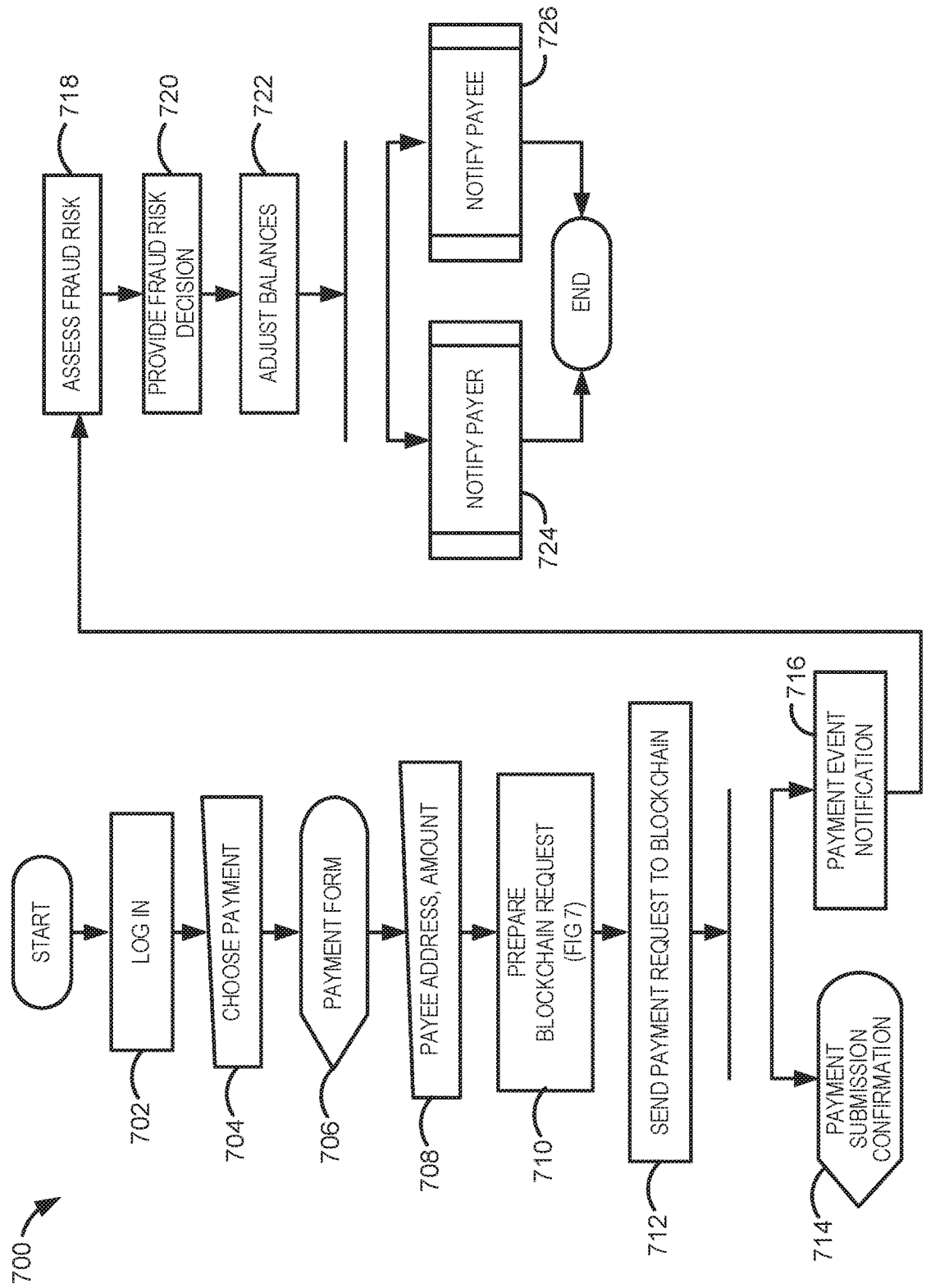
FIG. 7A illustrates a process for executing payment transactions between two parties on a payment network configured to operate on a blockchain-based leger, in accordance with various embodiments.
Figure 7B:
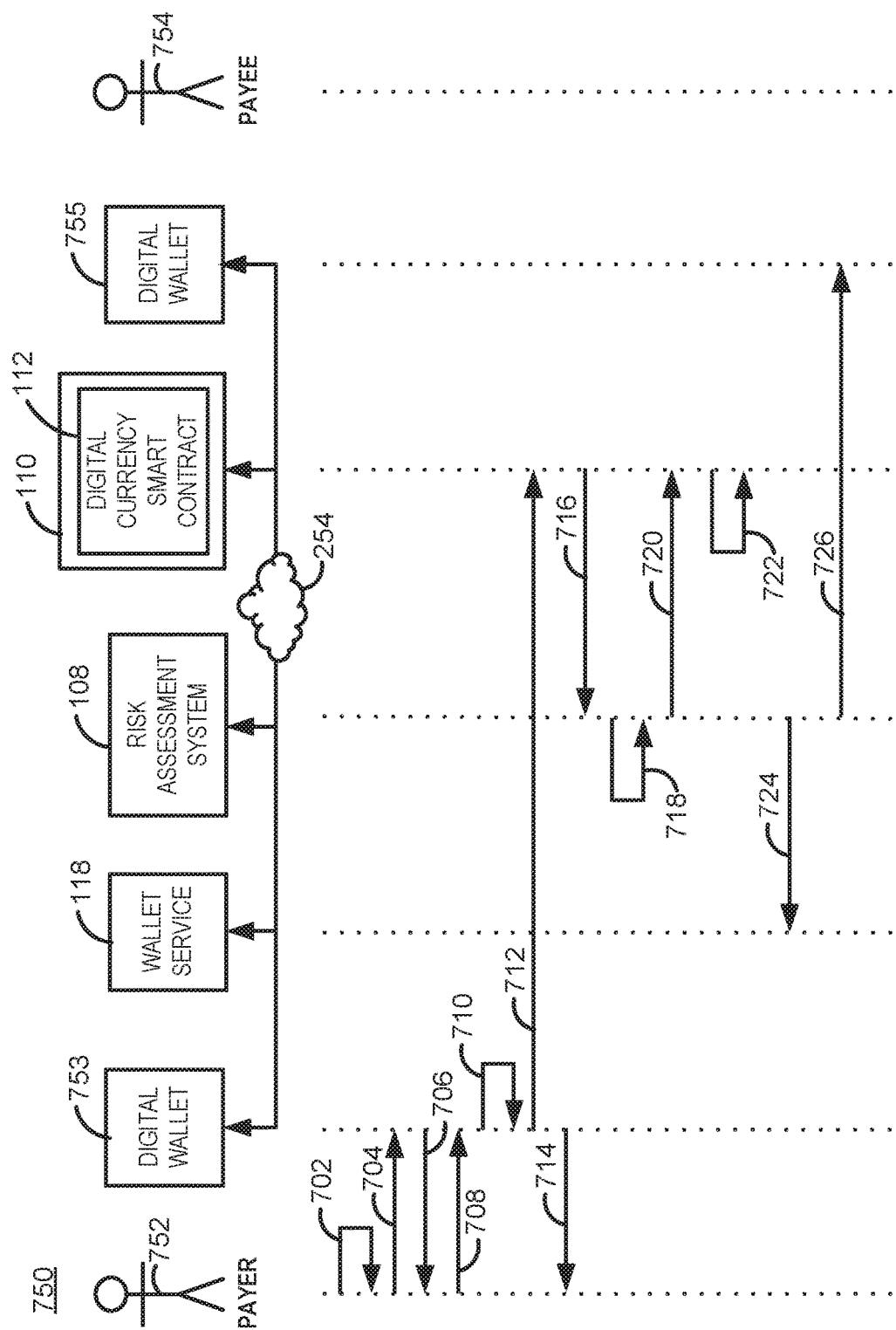
FIG. 7B illustrates a system for executing payment transactions between two parties on a payment network configured to operate on a blockchain-based leger, in accordance with various embodiments.

Referring now to FIGS. 7A and 7B, an exemplary process 700 is shown for completing payment transactions on a payment system 750, in accordance with various embodiments. Payment system 750 may include a payer 752 using a digital wallet 753 running on a user device 106 configured for electronic communication over network 254 with wallet service 118, risk assessment system 108, digital currency smart contracts 112 on blockchain 110, and digital wallet 755 running on a different user device 106. Payee 754 may interact with digital wallet 755 to receive payment from payer 752.

In various embodiments, process 700 may include payer 752 logging into digital wallet 753 as illustrated above in login process 300 (Block 702). Payer 752 may choose payment in digital wallet 120 (Block 704). Digital wallet 120 may display a payment form for completion by payer 752 on the user device 106 (Block 706). The payment form may be configured to receive payment details entered by payer 752 including fields for payee address, payee amount, payee name, and/or other payee information to facilitate the transfer of funds to payee 754 (Block 708).

In various embodiments, digital wallet 120 may prepare a blockchain request using process 500, for example (Block 710). The blockchain request may include the payment details including payee address and amount. Digital wallet 120 may interact with blockchain 110 using blockchain interface 116 to send the payment request to blockchain 110 (Block 712). Digital wallet 120 may present payer 752 with a payment submission confirmation (Block 714). A payment event notification may be generated in response to the transaction request for digital currency smart contract 112 on blockchain 110 (Block 716). The payment event notification may notify risk assessment systems 108 of a requested transaction for fraud risk assessment. The transaction request may be analyzed by risk assessment system 108 to assess whether the transaction poses an acceptable fraud risk (Block 718).

In various embodiments, the risk assessment system 108 may provide the fraud risk decision and enable an approval decision based at least in part on the fraud assessment (Block 720). In response to a positive risk assessment (i.e., an acceptable fraud risk), the transaction may be written in a block of the blockchain 110 with or without the risk assessment result included to adjust the account balances (Block 722). Risk assessment system 108 may notify payer 752 by communicating with wallet service 118 and/or digital wallet 753 (Block 724). Risk assessment system 108 may also notify payee 754 by communicating with wallet service 118 and/or digital wallet 755 (Block 726).

Figure 8A:
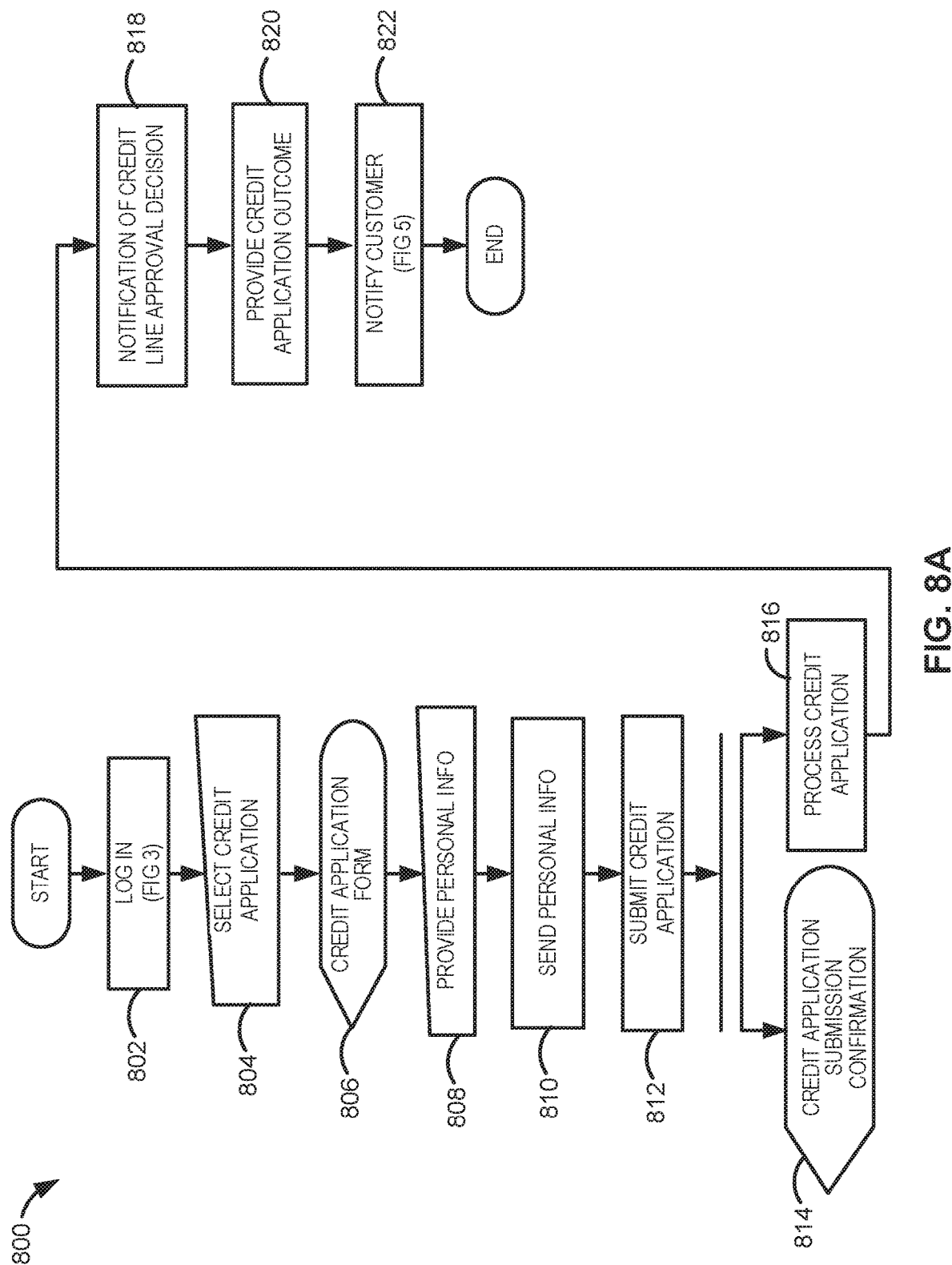
FIG. 8A illustrates a process for credit processing on a payment network configured to operate on a blockchain-based leger, in accordance with various embodiments.
Figure 8B:
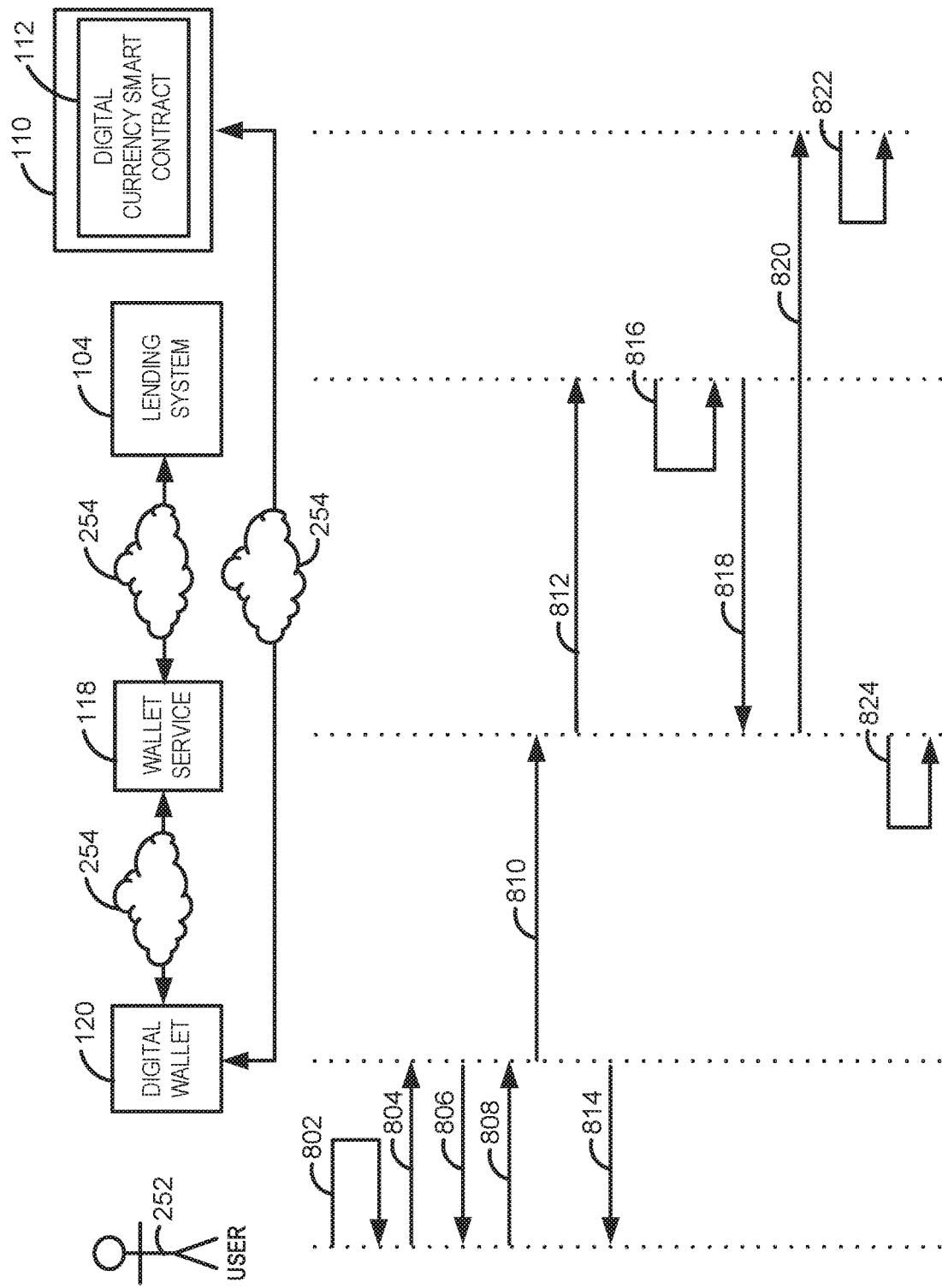
FIG. 8B illustrates a system for credit processing on a payment network configured to operate on a blockchain-based leger, in accordance with various embodiments.

Referring now to FIGS. 8A and 8B, an exemplary process 800 is shown for execution on credit processing system 850, in accordance with various embodiments. System 850 may include a digital wallet 120 operating on user device 106 in communication over network 254 with wallet service 118. Wallet service 118 may be in electronic communication with lending system 104 over network 254. Digital wallet 120 may also be in electronic communication over network 254 with digital currency smart contracts 112 maintained on blockchain 110.

In various embodiments, process 800 may include the user 252 logging into digital wallet 120 as illustrated above in login process 300 (Block 802). User 252 may select credit application from digital wallet 120 (Block 804). The digital wallet running on user device 106 may present the user with a credit application form (Block 804). The credit application form may include fields for personal information such as name, social security number, driver's license number, driver's license issue date, driver's license expiration date, telephone number, email address, or other personal information for use in the credit application process. User 252 may provide personal information to digital wallet 120 by completing the credit application form (Block 808).

In various embodiments, digital wallet 120 may transmit the personal information to wallet service 118 (Block 810). Wallet service 118 may submit the credit application to lending system 104 (Block 812). Digital wallet 120 may present user 252 with a credit application submission confirmation (Block 814). Lending system 104 may also process the credit application to determine whether to extend credit for user 252 (Block 816). In response to approving the credit application, lending system 104 may notify wallet service 118 of credit line approval decision (Block 818). Wallet service 118 may provide credit application outcome by writing the decision in digital currency smart contract 112 maintained on blockchain 110 (Block 820). Digital currency smart contract 112 and/or wallet service 118 may notify the customer of the crediting decision using push notification system 450 as described above, for example (Blocks 822).

A payment network based on a blockchain, as described herein, may simplify peer-to-peer payment networks by using the blockchain as a ledger. The settlement process for payees may be near-instant. The solution may be easily integrated into ecommerce platforms. The payment network may also lead to lower discount fees for merchants as the overhead cost of maintaining the network may be reduced. Additionally, any user can pay any other user. Transparency is very high for various embodiments using a consortium or public blockchain since accounting is performed, for example, by a decentralized autonomous organization (DAO) instead of a specific financial institution.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants, and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments". "one embodiment". "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE®, CHROME®, APPLE® Safari, or any other of the myriad software packages available for browsing the internet.

Practitioners will appreciate that a web client may or may not be in direct contact with an application server such as a digital wallet hub. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, NY), various database products available from ORACLE) Corporation (Redwood Shores, CA), MICROSOFT® Access® or MICROSOFT® SQL Server® by MICROSOFT® Corporation (Redmond. Washington). MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP. AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.192.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python. Visual Basic, SQL Stored Procedures. PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to "transaction account" may include any account that may be used to facilitate a financial transaction. Phrases and terms similar to "financial institution" or "account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a digital wallet service for a blockchain driven Deer-to-peer payment network, a request to complete a transaction from a digital crypto currency account associated with a payer digital wallet for entry on a blockchain ledger, wherein the request to complete the transaction includes a fiat currency amount and a payee address associated with a fiat currency account;
   sending, by the digital wallet service for the blockchain driven Deer-to-Deer payment network to a digital currency smart contract residing on the blockchain ledger, the request to complete the transaction to the blockchain ledger;
   approving, by a risk assessment service for the blockchain driven peer-to-peer payment network, the request to complete the transaction; and
   adjusting, by the digital currency smart contract residing on the blockchain ledger, a balance of the digital crypto currency account associated with the payer digital wallet and a balance of the fiat currency account in response to approval of the request to complete the transaction by writing the transaction comprising the fiat currency amount and the payee address to the blockchain ledger, wherein a value of the digital crypto currency substantially matches the fiat currency amount.

2. The method of claim 1, further comprising:
   transmitting, by the blockchain driven Deer-to-peer payment network and via the digital wallet service, a transaction detail to the digital currency smart contract of the blockchain ledger.

3. The method of claim 1, further comprising transmitting, by the blockchain driven Deer-to-peer payment network, a notification to the payer digital wallet that the transaction is successful.

4. The method of claim 3, wherein the notification comprises a push notification.

5. The method of claim 4, further comprising triggering the notification to be transmitted in response to writing the transaction to the blockchain ledger.

6. The method of claim 1, further comprising registering, by the blockchain driven Deer-to-peer payment network, the payer digital wallet having a private key associated with the payer digital wallet in response to validating a bank account associated with the payer digital wallet against the blockchain ledger.

7. The method of claim 6, wherein the private key is generated by a user device and stored locally on the user device.

8. A computer-based system, comprising:
   a processor for a digital wallet service of a blockchain driven peer-to-peer payment network that is configured to receive a request to complete a transaction from a digital crypto currency account associated with a payer digital wallet for entry on a blockchain ledger, wherein the request to complete the transaction includes a fiat currency amount and a payee address associated with a fiat currency account; and send the request to complete the transaction to the blockchain ledger;
   a processor for a risk assessment service for the blockchain driven peer-to-peer payment network that is configured to approve the request to complete the transaction; and
   a processor for a digital currency smart contract residing on the blockchain ledger that is configured to adjust a balance of the digital crypto currency account associated with the payer digital wallet and a balance of the fiat currency account in response to approval of the request to complete the transaction by writing the transaction comprising the fiat currency amount and the payee address to the blockchain ledger, wherein a value of the digital crypto currency substantially matches the fiat currency amount.

9. The system of claim 8, wherein the processor of the digital wallet service is further caused to transmit a transaction detail to the digital currency smart contract of the blockchain ledger.

10. The system of claim 8, wherein the processor of the digital currency smart contract is further caused to transmit a notification to the payer digital wallet that the transaction is successful.

11. The system of claim 10, wherein the notification comprises a push notification.

12. The system of claim 11, wherein the processor of the digital currency smart contract is further caused to trigger the notification to be transmitted in response to writing the transaction to the blockchain ledger.

13. The system of claim 8, wherein the processor of the digital wallet service is further caused to register the payer digital wallet having a private key associated with the payer digital wallet in response to validating a bank account associated with the payer digital wallet against the blockchain ledger.

14. The system of claim 13, wherein the private key is generated by a user device and stored locally on the user device.

15. A non-transitory computer readable storage medium having instructions stored thereon that, in response to execution by a computing device, cause the computing device to perform operations comprising:
   receiving, by a digital wallet service for a blockchain driven Deer-to-peer payment network, a request to complete a transaction from a digital crypto currency account associated with a payer digital wallet for entry on a blockchain ledger, wherein the request to complete the transaction includes a fiat currency amount and a payee address associated with a fiat currency account;
   sending, by the digital wallet service for the blockchain driven Deer-to-Deer payment network to a digital currency smart contract residing on the blockchain ledger, the request to complete the transaction to the blockchain ledger;
   approving, by a risk assessment service for the blockchain driven peer-to-peer payment network, the request to complete the transaction; and
   adjusting, by the digital currency smart contract residing on the blockchain ledger, a balance of the digital crypto currency account associated with the payer digital wallet and a balance of the fiat currency account in response to approval of the request to complete the transaction by writing the transaction comprising the fiat currency amount and the payee address to the blockchain ledger, wherein a value of the digital crypto currency substantially matches the fiat currency amount.

16. The non-transitory computer readable storage medium of claim 15, wherein the operations further comprise:
transmitting, by the blockchain driven peer-to-peer payment network and via the digital wallet service, a transaction detail to the digital currency smart contract of the blockchain ledger.

17. The non-transitory computer readable storage medium of claim 15, wherein the operations further comprise transmitting, by the blockchain driven peer-to-peer the payment network, a notification to the payer digital wallet that the transaction is successful.

18. The non-transitory computer readable storage medium of claim 17, wherein the notification comprises a push notification.

19. The non-transitory computer readable storage medium of claim 18, wherein the operations further comprise triggering the notification to be transmitted in response to writing the transaction to the blockchain ledger.

20. The non-transitory computer readable storage medium of claim 15, wherein the operations further comprise registering the payer digital wallet having a private key associated with the payer digital wallet in response to validating a bank account associated with the payer digital wallet against the blockchain ledger.

* * * * *